United States Patent Office 2,763,590
Patented Sept. 18, 1956

2,763,590

BACITRACIN RECOVERY

Merton G. Gollaher, Yorktown Heights, and Edward J. Honohan, Forest Hills, N. Y., assignors to Chas. Pfizer & Co., Inc., Brooklyn, N. Y., a corporation of Delaware No Drawing. Application May 21, 1954, Serial No. 431,596

3 Claims. (Cl. 167—65)

This invention is concerned with a process for the purification of the antibiotic, bacitracin. In particular, it is concerned with a process consisting of a combination of steps which is effective in producing bacitracin of particularly high quality and stability. The process has a number of other advantages.

A variety of processes have been used for the recovery of the valuable antibiotic, bacitracin. These have included such methods as precipitation, for example with tannic acid or picric acid, solvent extraction with polar organic solvents and others.

It has now been found that the use of a combination of two process steps in a specific sequence results in the isolation of bacitracin which is of a particularly high purity and stability. Comparison of the product obtained by this new process has established its superiority over materials prepared by other methods and over commercially available samples of bacitracin. In addition, it has been shown that the purity of the material which may be prepared by the present relatively simple process is often appreciably higher than materials which have been isolated by tedious laboratory procedures designed to isolate the antibiotic in highest purity for chemical studies of structure and properties.

The process of the present invention consists of precipitating bacitracin with a soluble molybdate salt from an impure aqueous solution followed by extraction of the bacitracin from the precipitate at a slightly acidic to slightly basic pH and then extraction of the bacitracin with a partially water-miscible polar organic solvent, preferably butanol. The purified bacitracin is recovered from the solvent extract, for instance, by extraction into water. The aqueous solution may be dried, preferably from the frozen state or it may be used for many purposes in the form of the purified aqueous extract.

The process of this invention, when operated according to the detailed description given below, results in a product having a potency, as determined by a standard bacitracin assay procedure, of from 65 to 80 units per milligram. Careful operation results in material generally having a potency of greater than 70 units per milligram. The highest potency of bacitracin heretofore reported in the scientific literature as obtained by a process involving precipitation and repeated solvent extraction was 66 units per milligram (Craig et al., Journal of Biological Chemistry, vol. 199, pp. 259–266 (1952)). Commercially available samples of bacitracin have been tested to determine their stability at elevated temperatures in the dry state. Comparison of these stabilities have shown that the product obtained by the present method is definitely superior.

In operating the present process, the impure aqueous solution, for instance bacitracin fermentation broth, is filtered to remove various solid materials. In the case of the fermentation broth, this is preferably done at an acid pH and with the addition of filteraid to assure a clear filtrate. Fermentation broths containing at least about 20 units of bacitracin per milliliter are most useful and acidification to a pH of from about 1.5 to about 3.0 has proven satisfactory. The use of sulfuric acid is favored over other acids, although any mineral acid may be used.

Precipitation of bacitracin from an impure aqueous solution thereof is effected at an acid pH, preferably from about 1.5 to about 4.0. It has been found most convenient to adjust the pH of the filtered bacitracin solution from a more acid value to a pH of at least 5.0 before adding the water-soluble molybdate. Alkalies such as ammonium hydroxide, sodium hydroxide, sodium carbonate, potassium hydroxide, etc. are useful. The pH is then slowly readjusted to from about 1.5 to about 4.0. Sulfuric acid is quite effective for this adjustment. Also useful are hydrochloric, hydrobromic, and phosphoric acid. The use of this sequence of operations assists in obtaining a more granular type of precipitated bacitracin-molybdate which is more easily filtered. However, it is not essential that the addition of the molybdate occur at a higher pH followed by acidification. Of the water-soluble molybdates, ammonium molybdate has been found to be quite convenient for utilization in this process, although other salts, such as the potassium, lithium and sodium salts, are also convenient. Filtration of the solid in the presence of a filteraid assists in a rapid and complete operation.

The precipitated complex of bacitracin-molybdate is treated in water at a pH of at least 5.0 to obtain a clear solution of bacitracin and precipitate the molybdenum. This step may be effected with alkali metal hydroxides, alkaline earth metal hydroxides, and water-soluble organic bases; however, ammonium hydroxide is particularly useful for this purpose. Among the useful compounds are sodium, potassium, and lithium hydroxides, carbonates, and bicarbonates, barium hydroxide, calcium hydroxide, trimethylamine, triethylamine, triethanolamine. etc. After the bacitracin has dissolved and the insoluble molybdenum compound has precipitated, it is removed by filtration utilizing a suitable quantity of filteraid to obtain a clear filtrate. The filtrate may be obtained at a concentration of as high as 400 units per milliliter, if a convenient volume of liquid is used for the operation. The solid may be washed or repulped with water to assure relatively complete removal of the bacitracin.

The aqueous filtrate obtained from this step may be extracted by means of a polar organic solvent which is partially miscible with water, preferably butanol (pentanols, hexanols, benzyl alcohol and phenols are also useful), at a pH of from about 6.0 to about 8.5. This pH is preferably adjusted with an alkali metal hydroxide, such as sodium or potassium hydroxide. The solvent extract may then be reextracted with water in the presence of acid, e. g., hydrochloric, hydrobromic, sulfuric, and phosphoric acids. Adjustment of the pH of this solution (to from about 5 to about 7), which may most conveniently be effected by contacting the solution with a basic ion-exchange resin, results in a highly purified aqueous solution of bacitracin which may be dried from the frozen state to yield a dry product of particularly high potency and stability.

It has been found that both the amount of molybdate used and the pH of the precipitation may be varied within certain limits in operating the present process. However, there are certain pHs and molybdate proportions which give a maximum yield. In the following table are given results obtained by precipitation of a filtered bacitracin broth under standard conditions with a fixed proportion of ammonium molybdate at varying pHs. In this case, 100 milliliters of filtered bacitracin broth were treated with 1.04 grams of ammonium molybdate according to the procedure described above. The initial potency of the broth was 130 units per milliliter. In the first column of the table is given the pH at which the various tests were conducted. In the second column is given the units of bacitracin left unprecipitated in the fermentation broth, and, in the third column, there is given the percent of the antibiotic precipitated by this procedure.

| pH | Spent Aqueous Assay, units/ml. | Percent Precipitated |
|---|---|---|
| 3.8 | 78 | 40.5 |
| 3.5 | 37 | 71.6 |
| 2.15 | 1 | 100 |
| 1.8 | 1 | 100 |

As noted above, the proportion of molybdate used for the precipitation also causes some variation in the effectiveness of the process. In general, it is preferred to use at least about 150 milligrams of molybdate (in the form of ammonium molybdate) per 100 milliliters of filtered, impure aqueous solution of bacitracin. In the following table is summarized the results of a series of tests in which filtered fermentation broth having a potency of 96 units per milliliter was subjected to precipitation with varying amounts of ammonium molybdate at a pH of 2.0.

| Weight Ammonium Molybdate Added in mg./100 ml. | Spent Aqueous potency, u./ml. | Percent Precipitated |
|---|---|---|
| 66.7 | 96 | 0 |
| 133.0 | 75 | 20.8 |
| 266.0 | 2 | 98 |
| 333.0 | 10 | 89.7 |
| 466.0 | 1.2 | 98.7 |
| 533.0 | 1 | 100 |

Comparable amounts of the other water-soluble molybdates give similar results.

It has been stated that the bacitracin precipitated by molybdate from impure aqueous solutions may be recovered by treatment of the precipitate with water and an alkali, preferably ammonium hydroxide. However, a variety of other alkaline systems have been used more or less effectively for the removal of bacitracin from such precipitates. In general, the process may be operated with either water or butanol and a variety of alkaline agents may be used, including ammonium hydroxide, triethylamine, calcium hydroxide and sodium hydroxide. The presence of certain salts, such as calcium chloride or triethylamine sulfate, assists, to a certain extent, in solubilizing the antibiotic. As noted above, it is often desirable to filter the solid molybdate precipitate from the bacitracin solution and then reextract the solid to assure the maximum removal of the valuable antibiotic. In the following table is compared the efficacy of various combinations of reagents for this extraction step.

| Recovery Medium | Number of Repulps | Yield (from fermentation broth) |
|---|---|---|
| butanol-triethylamine-calcium chloride | 2 | 86.5 |
| water-calcium chloride-calcium hydroxide-pH7-8 | 2 | 74.2 |
| water-n-butanol-calcium hydroxide | 1 | 50.7 |
| n-butanol-ammonia | 1 | 61.5 |
| n-butanol-triethylamine-triethylamine sulfate | 1 | 53.6 |
| water-calcium chloride-calcium hydroxide-pH6-7 | 1 | 27.6 |
| water-calcium chloride-calcium hydroxide-pH8-10 | 2 | 40.8 |
| water-sodium hydroxide | 2 | 58.8 |
| water-calcium chloride-calcium hydroxide-pH 5.5 | 3 | 46.7 |
| water-ammonium hydroxide-pH 6.3 | | 85.5 |

The use of ammonium hydroxide with water has been found to be the most convenient of these procedures, although the others have proven effective.

Care must be exercised in extracting the antibiotic from its molybdate complex in order to obtain the maximum in purity. It is essential that during extractions the aqueous or solvent extracts be carefully clarified to remove all suspended material in order to assure bacitracin of the highest quality. The purified aqueous solution of bacitracin may be treated with ammonium oxalate and a ferrocyanide to remove all traces of calcium and heavy metals. In general, if care has been exercised in the prior steps of the process, these contaminants are present to a very limited extent. If two successive extraction steps are used with the partially water-miscible polar organic solvent, it may be advisable to apply this treatment to the aqueous solution before the final butanol extraction. The addition of a polyvalent metal sequestering agent to the aqueous solution before the final extraction with butanol has advantages also. It helps to prevent the extraction of trace polyvalent metal contaminants into the solvent and thus prevents the appearance of such materials in the finished product.

In some cases it has been found useful as an auxiliary step to utilize a carbon treatment of purified aqueous concentrates of bacitracin to remove colored impurities which may persist into the final product. However, these colored impurities do not seriously interfere with the quality of the finished material and need not be removed to obtain a useful, high quality product. It has been noted that rapid handling of the various stages of the process assists, to a certain extent, in assuring maximum quality material. This is particularly true of the stages of the process in which bacitracin is in contact with the molybdenum. When the molybdate complex of bacitracin is treated to recover the bacitracin, it is advisable to filter the mixture as soon as possible, since long standing tends to make the filtration much more difficult.

It should be pointed out that the present process is a unique combination of steps; specifically, a molybdate precipitation step and a butanol extraction step which are unexpectedly effective in obtaining a high quality and highly stable bacitracin product. Material of a quality heretofore unavailable in experimental work, let alone industrial work, has been obtained. The combination of steps used results in this unique product. Combinations of other known recovery steps for bacitracin have been compared with the present process and none of these has resulted in the same quality product.

In the following table is given the stability of samples of bacitracin held at elevated temperatures in the dry condition for periods of 64 days and 14 days. Samples were removed at periodic intervals and the potency of the material was determined. From this a half life of the bacitracin sample under a particular condition was calculated. Samples 1 and 2 are material prepared according to the present process. Samples 3, 4, 5, and 6 are typical commercially available bacitracin samples.

| Sample Number | Initial Potency, units/mg. | Half Life at 35-37° C. | Half Life at 55-57° C. |
|---|---|---|---|
| | | Days | Days |
| 1 | 78.1 | 293 | 26 |
| 2 | 78.0 | 346 | 31 |
| 3 | 55.7 | 104 | 15 |
| 4 | 61.0 | 103 | 14 |
| 5 | 56.0 | 129 | 18 |
| 6 | 57.0 | 134 | 23 |

It should be noted that these half life periods were calculated assuming that the decomposition is a first order reaction. These figures demonstrate the very greatly increased stability of the product prepared by the present method as compared to commercially available material.

The following examples are given by way of illustration and are not to be considered as the sole embodiments of this invention. It is to be understood that protection hereof is only limited by the specific wording of the appended claims.

Example I

Bacitracin fermentation broth assaying 32.5 units/milliliter was adjusted to pH 2.6 with sulfuric acid. Sixty grams of a diatomaceous earth filteraid was added to each liter of the broth. The mixture was filtered on a porcelain filter and washed with water so that the volume of the filtrate was 25 percent greater than the original volume of the broth. The potency of the filtered broth was 28.3 units/milliliter. It was adjusted to a pH of 5.2 with 20 percent aqueous sodium hydroxide solution. To forty liters of the filtered broth was added 50 grams of diatomaceous earth filteraid. The mixture was stirred and 100 grams of ammonium molybdate was gradually added. After stirring for an additional 30 minutes, the pH of the mixture was slowly adjusted to 2.5 with 50 percent sulfuric acid. The mixture was stirred for a further 30 minutes, and it was then filtered on a porcelain filter which had been precoated with a diatomaceous earth filteraid. A total of 180 grams of filteraid was used. The filtrate was discarded.

The solid product on the porcelain filter was suspended in 1900 milliliters of water and the mixture was treated with 30 percent aqueous ammonium hydroxide until a stable pH of 6.8 was attained. The solution was removed from the solid by centrifuging. The clarified liquid had a volume of 1850 milliliters and was found to have a potency of 345 units of bacitracin per milliliter. The solid material was resuspended in 1400 milliliters of water, stirred for several minutes and filtered with an additional 10 grams of filteraid. A total of 1445 milliliters of filtrate was obtained and this assayed 132.5 units of antibiotic per milliliter. The two aqueous solutions were combined and adjusted to pH 7.8 with 20 percent sodium hydroxide solution. The solution was saturated with 366 milliliters of butanol and then extracted with five 600-milliliter portions of water-saturated butanol. The combined solvent extracts, having a total volume of 3,027 milliliters, assayed 155 units/milliliter of antibiotic. The exhausted aqueous solution was discarded. The combined butanol extracts were stirred with 600 milliliters of water and the mixture was adjusted to pH 3.0 with sulfuric acid. The extraction with water was repeated five times. The aqueous extracts were then combined to yield 3,789 milliliters of solution assaying 100 units of antibiotic per milliliter. The butanol was discarded.

The concentrated aqueous extract of purified bacitracin was adjusted to pH 6.2 by contacting the solution with a strongly basic ion-exchange resin (Rohm and Haas Amberlite IRA-400 made by a process disclosed in U. S. Patent 2,591,573 and having as its active exchanging group principally quaternary ammonium ions) in the hydroxyl form. The solution was then concentrated under vacuum to 452 milliliters of a solution assaying 718 units/milliliter. To the solution was added two grams of ammonium oxalate and 1.5 grams of potassium ferrocyanide. A slight hazy precipitate formed. Twenty-seven milliliters of an aqueous solution of ethylene diamine tetra acetic acid (Versene), a sequestering agent was added and the pH was adjusted to 7.8 with 20 percent sodium hydroxide solution. The solution was saturated with 55.5 milliliters of butanol and it was then extracted with seven 100-milliliter portions of water-saturated butanol. The combined solvent extracts were treated with an equal volume of water and the pH was adjusted to 6.2 with a nuclear sulfonic acid cation-exchange resin (Rohm and Haas Amberlite IR120 made by a process disclosed in U. S. Patent 2,366,077) in the hydrogen form. The two-phase mixture was concentrated under vacuum to 210 milliliters, and it was then freeze-dried yielding 3.2 grams of highly purified bacitracin assaying 78 units/milligram. This material proved to be completely satisfactory for use in pharmaceutical preparations and had definite advantages due to its increased stability and high potency.

What is claimed is:

1. A process for the recovery of bacitracin, which comprises filtering an impure aqueous solution of bacitracin contacting the filtrate at a pH of from about 1.5 to about 4.0, with a soluble molybdate in a proportion equivalent to at least 133 mg./100 ml. calculated as ammonium molybdate, adjusting the thus-produced bacitracin-molybdate in water to a pH of at least 5.0, soon thereafter separating the so-produced aqueous concentrate of bacitracin and extracting the bacitracin solution with a partially water-miscible polar organic solvent selected from the class consisting of butanols, pentanols, hexanols, benzyl alcohol and phenols, at a pH from about 6.0 to about 8.5.

2. A process as claimed in claim 1 wherein the molybdate is ammonium molybdate.

3. A process as claimed in claim 1 wherein the bacitracin is extracted into butanol and the butanol extract is re-extracted with water at an acidic pH to obtain a purified aqueous concentrate of bacitracin.

References Cited in the file of this patent

UNITED STATES PATENTS

| | | |
|---|---|---|
| 2,453,534 | Olcott et al. | Nov. 9, 1948 |
| 2,582,921 | Charney | Jan. 15, 1952 |
| 2,656,347 | Goett et al. | Oct. 20, 1953 |

OTHER REFERENCES

Anker et al.: J. Bact., vol. 55, February 1948, pp. 249–255.

Newton et al.: J. Biochem., March 1953, pp. 604–613.